United States Patent

Muehlhausen

[19]

[11] Patent Number: 5,580,122
[45] Date of Patent: Dec. 3, 1996

[54] PASSENGER VEHICLE SCUTTLE AND COCKPIT REGION CONSTRUCTION

[75] Inventor: Mark Muehlhausen, Stuttgart, Germany

[73] Assignee: Mercedes-Benz AG, Stuttgart, Germany

[21] Appl. No.: 405,771

[22] Filed: Mar. 17, 1995

[30] Foreign Application Priority Data

Mar. 17, 1994 [DE] Germany ............................ 44 09 081.1

[51] Int. Cl.⁶ .................................................. B62D 25/08
[52] U.S. Cl. .......................... 296/194; 296/70; 296/192; 296/901
[58] Field of Search ............................... 296/70, 72, 192, 296/194, 191, 901; 280/779; 180/90

[56] References Cited

U.S. PATENT DOCUMENTS

| | | | |
|---|---|---|---|
| 4,391,465 | 7/1983 | Piano | 296/208 |
| 4,733,739 | 3/1988 | Lorenz et al. | 296/72 X |
| 5,088,571 | 2/1992 | Burry et al. | 296/70 X |
| 5,364,159 | 11/1994 | Kelman et al. | 296/192 |

FOREIGN PATENT DOCUMENTS

| | | | |
|---|---|---|---|
| 0494562 | 7/1972 | European Pat. Off. | 296/194 |
| 0119131A1 | 3/1983 | European Pat. Off. | 296/191 |
| 0124093A3 | 4/1984 | European Pat. Off. . | |
| 0370342A2 | 11/1989 | European Pat. Off. . | |
| 0456531 | 11/1991 | European Pat. Off. | 296/70 |
| 2211185 | 9/1972 | Germany | 296/901 |
| 119131 | 9/1984 | Germany | 296/191 |
| 3634559 | 6/1987 | Germany | 296/70 |
| 4105679A1 | 8/1991 | Germany . | |
| 4232846 | 3/1994 | Germany | 280/779 |
| 2196584 | 5/1988 | United Kingdom | 296/901 |

*Primary Examiner*—Dennis H. Pedder
*Attorney, Agent, or Firm*—Evenson, McKeown, Edwards & Lenahan, P.L.L.C.

[57] ABSTRACT

A constructional unit for the region of the scuttle and the cockpit of a passenger car, particularly of a small two-seater, reduces the production costs and saves weight. The constructional unit is formed from two composite parts which consist of deep-drawn sheet metal, preferably of steel, and of plastic, preferably PA 6/GF 30, injection-molded thereon. One composite part forms the scuttle as the front end wall of the passenger space, and the other composite part forms the dashboard carrier. The sheet-metal component of each composite part is shaped to allow for extensive forceflux during the absorption of the operating load within the composite part and at the connection points with the body. Bores or the like at specific locations constitute points for anchoring the plastic injection-molded on in relation to the sheet-metal part. The injection-molded on plastic is shaped to form a ribbing stiffening the sheet-metal parts and also suitably shaped receptacles for various add-on parts.

5 Claims, 4 Drawing Sheets

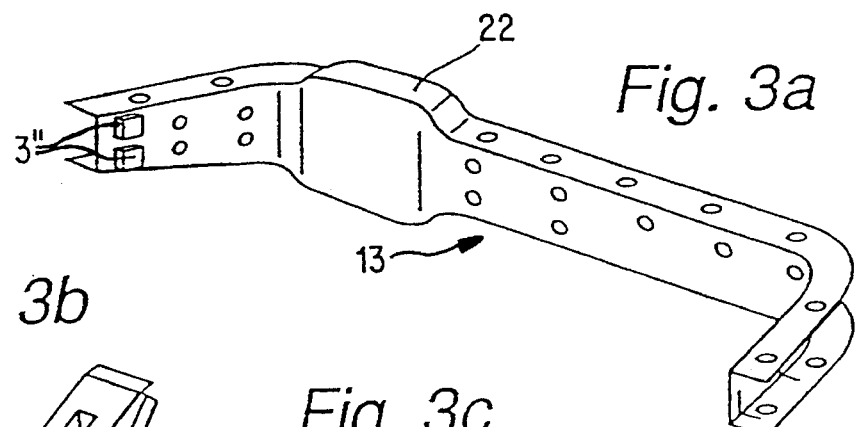
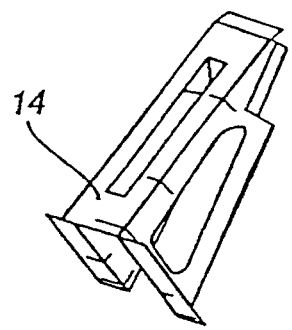
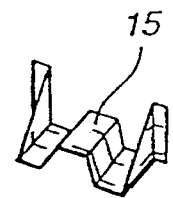
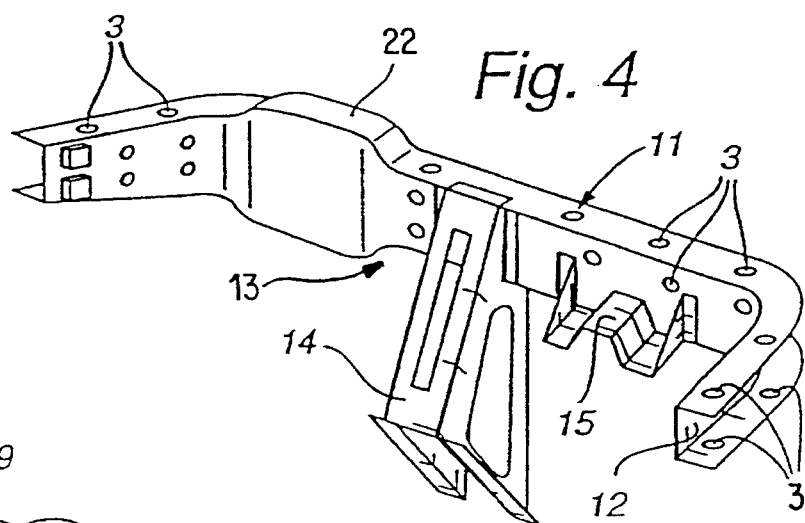
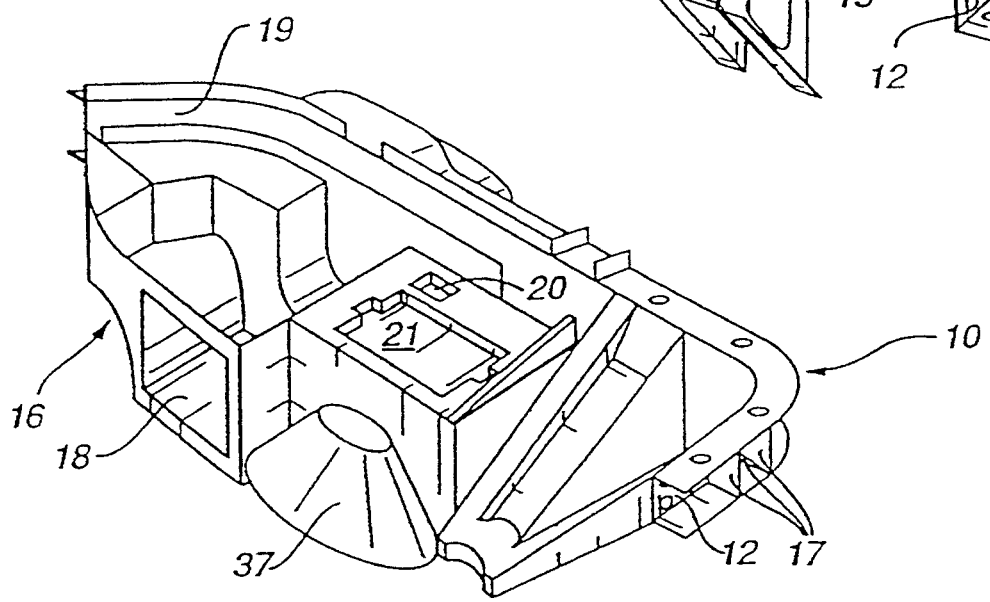

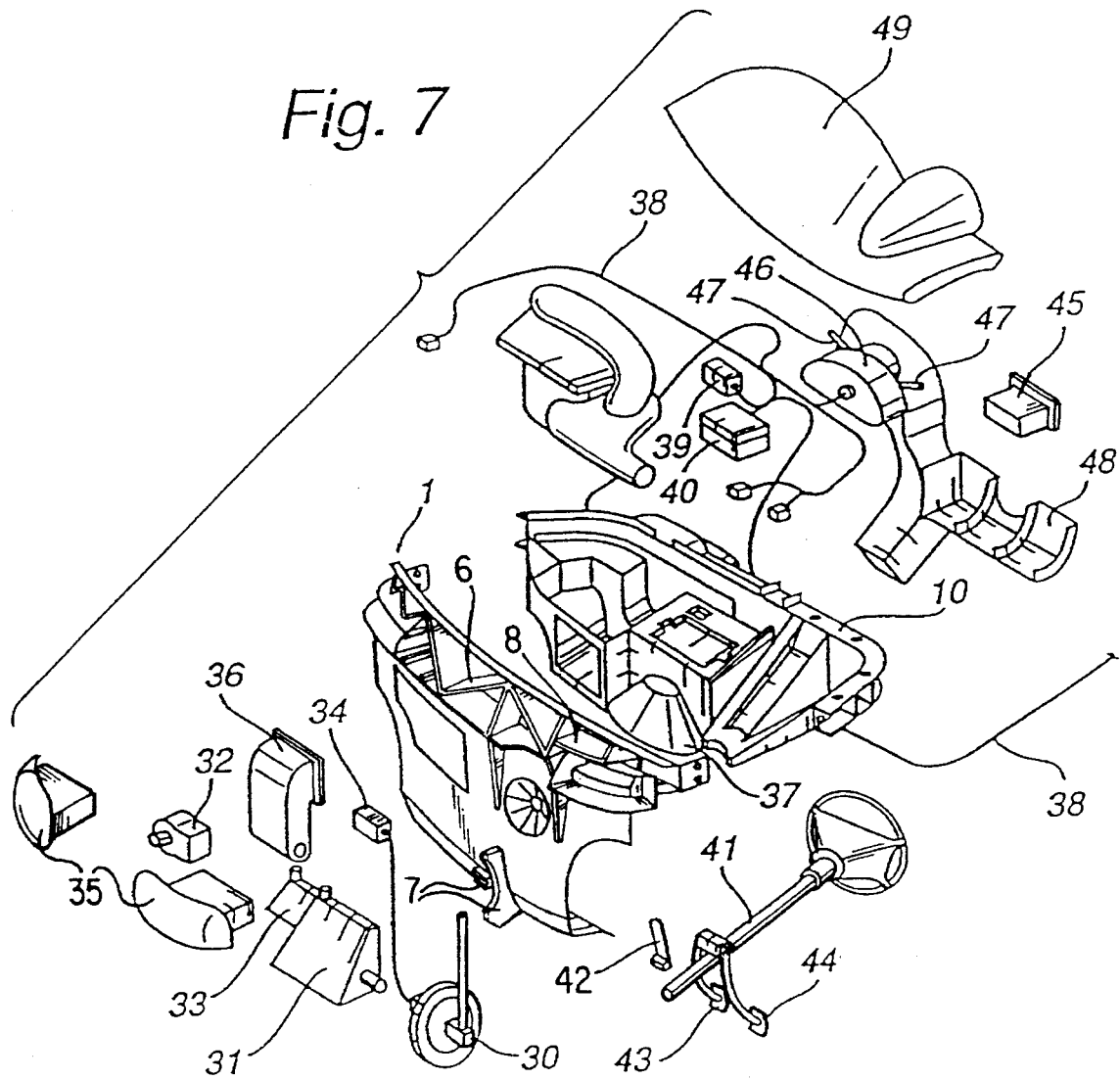

PASSENGER VEHICLE SCUTTLE AND COCKPIT REGION CONSTRUCTION

BACKGROUND AND SUMMARY OF THE INVENTION

The present invention relates to a movable constructional unit, capable of being built into a vehicle body, for the region of the scuttle and of the cockpit of a passenger car, particularly of a small two-seater.

Known constructional units having a comparable function, as shown in German Patent No. 3,315,646, are assembled from a multiplicity of individual components, thus making the process for producing the constructional units more expensive.

DE 4,105,679 A1 shows a preassembled constructional unit for the scuttle region of motor vehicles. However, this unit contains only suggests a decentralized or off-line mounting of relatively large ranges of components. No description is provided as to how the supporting structure of the scuttle region could be produced cost-effectively and nevertheless in a functionally suitable manner in every meaningful respect.

An object of the present invention is to provide an improved constructional unit in which its weight is reduced, comparable load-bearing capacity and functioning are preserved, and that its production becomes less expensive.

This object has been achieved according to the present invention by providing that the constructional unit comprises two composite parts each of which consists of deep-drawn sheet metal and of plastic injection-molded thereon, one composite part forming a scuttle as the front end wall of a passenger space and the other composite part forming the dashboard carrier. Further, the sheet-metal component of each composite part being configured to transmit without failure operating loads within the composite part and at connection points with the body, and, at least one of bores perforations and set-out tongues being provided at specific locations on the sheet metal components, to serve as positive anchoring points for the injection-molded on plastic, and the injection-molded on plastic being configured to form a ribbing stiffening the sheet-metal parts and receptacles of predetermined shape for various add-on parts.

Accordingly, the scuttle of the present invention is formed as an integral composite constructional part from drawn sheet metal and plastic injection-molded thereon. In this construction, a large-area sheet-metal pressing shaped with relatively little filigree and having a reinforcement, integrated in the sheet metal, for the portions subjected to higher load, (for example the pedal receptacle and the steering-column mounting), is introduced into an injection-molding die and has a thermoplastic injected thereround. Filigree structures of the composite constructional part can thereby be made quickly, in a simple and standard operation and, therefore, cost-effectively for reinforcements or receptacles intended for add-on parts. Although the injection-molding outsert technique employed here is known per se, it nevertheless has surprising, previously unrecognized advantages in the present use.

BRIEF DESCRIPTION OF THE DRAWINGS

These and other objects, features and advantages of the present invention will become more readily apparent from the following detailed description thereof when taken in conjunction with the accompanying drawings wherein:

FIGS. 3a, 3b and 3c are perspective views of the individual sheet-metal parts of the dashboard carrier;

FIG. 4 is a perspective view showing the extent of the assembled dashboard carrier, consisting of the individual sheet-metal parts shown in FIGS. 3a–3c, after the individual parts have been welded together;

FIG. 5 is a perspective view of the dashboard carrier of FIG. 4 after the plastic has been injection-molded thereon;

FIG. 7 is perspective exploded view showing the two parts of FIG. 6 additionally with the other add-on parts of the scuttle and cockpit module.

DETAILED DESCRIPTION OF THE DRAWINGS

Figure 6:
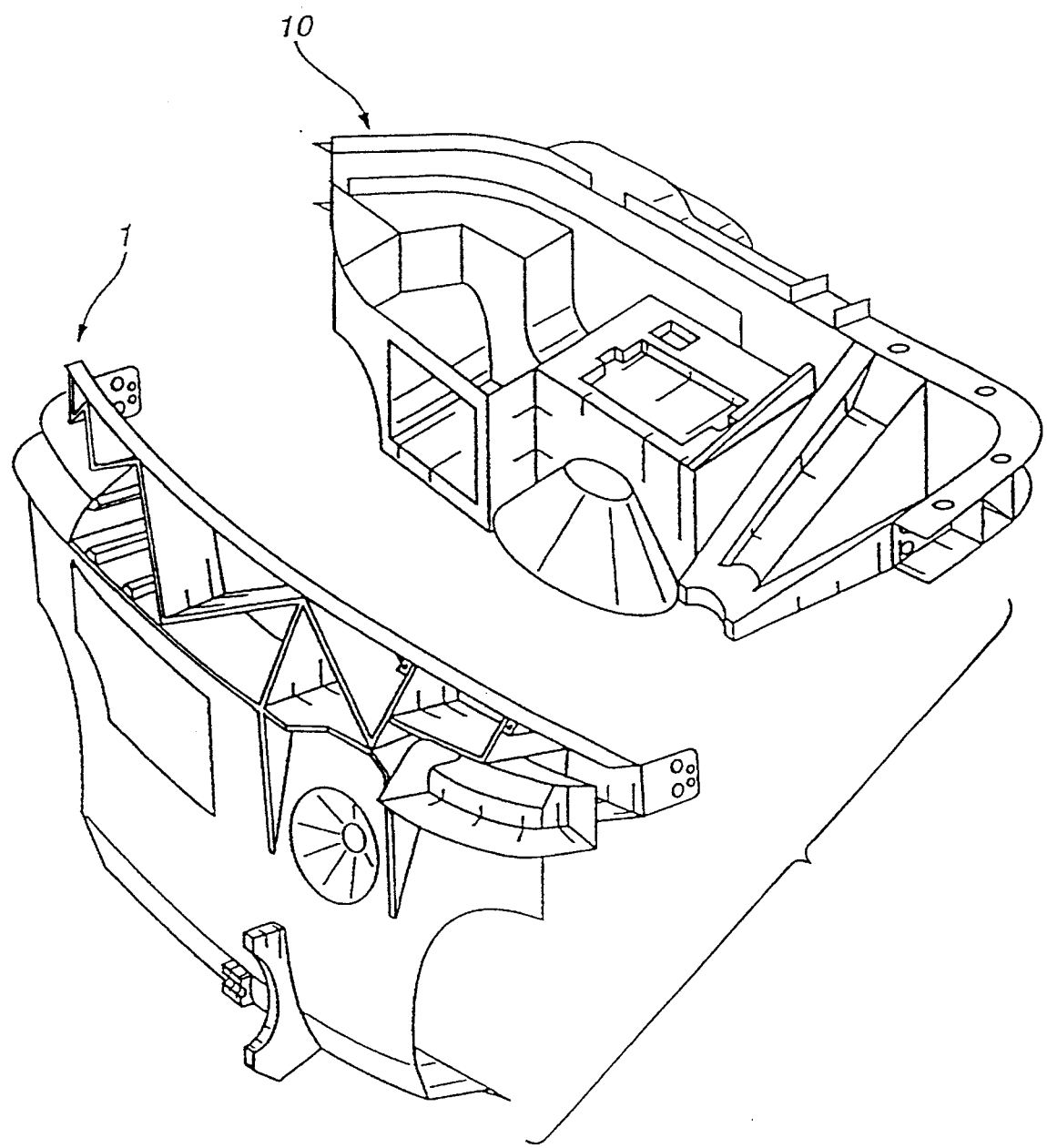
FIG. 6 is a perspective view showing the two composite constructional parts according to FIGS. 2 and 5 about to be assembled to form the supporting substance of a scuttle and cockpit module.

Generally speaking, the drawing figures show, in perspective and exploded representation, the individual parts of a movable constructional unit, capable of being built into a vehicle body, for the scuttle and cockpit regions of a passenger car, particularly of a small two-seater. To reduce the production costs and the weight, the constructional unit is formed in its supporting substance from two composite parts each of which consists of deep-drawn sheet metal and of plastic injection-molded thereon. One composite part forms the scuttle designated generally by numeral 1 in FIG. 6 as the front end wall of the passenger space and the other composite part forming the dashboard carrier designated generally by numeral 10.

Figure 1:
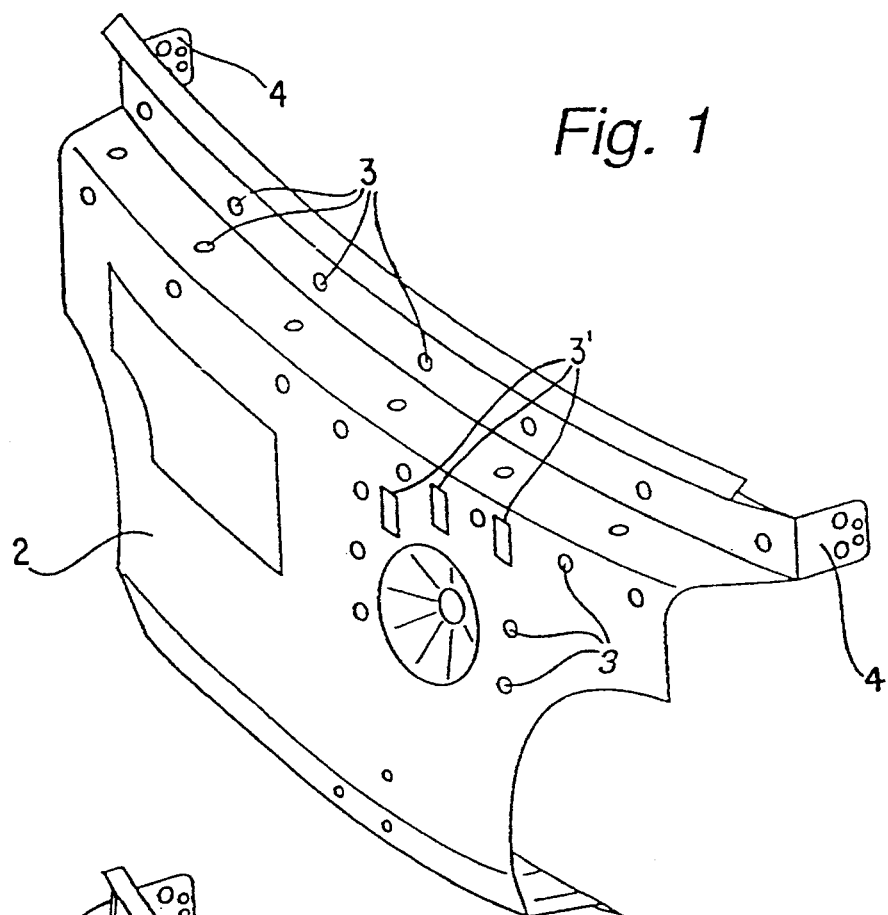
FIG. 1 is a perspective view of the sheet-metal part of the scuttle without the plastic injection-molded thereon.
Figure 2:
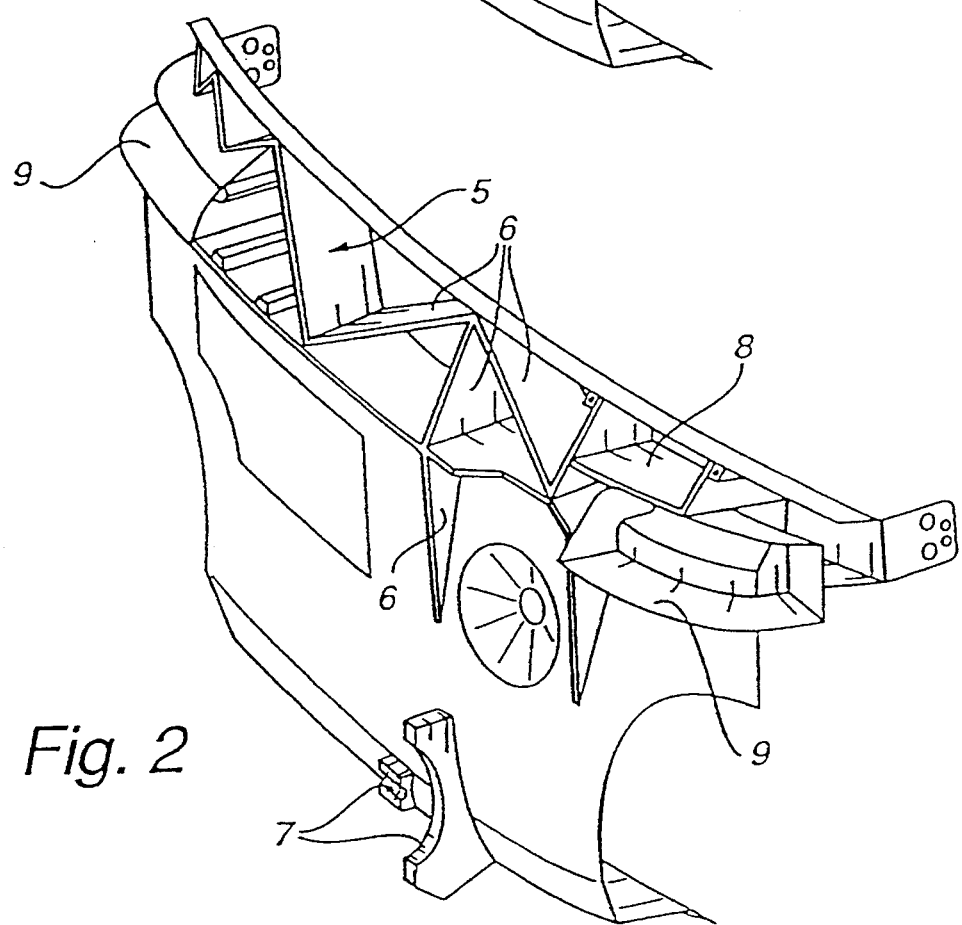
FIG. 2 is a perspective view of the sheet-metal part of FIG. 1 after plastic has been injection-molded thereon.

The sheet-metal component 2, 11 of each composite part 1, 10 respectively is configured to allow for the extensive forceflux resulting from operating loads within the composite part and at the respective connection points 4, 12 with the car body. By making circular and rectangular bores 3, 3' and set-out tongues 3" at specific locations on the parts, anchoring points for the plastic 5, 16 injection-molded thereon as seen in FIGS. 2 and 5 respectively are provided for the positive anchoring of the plastic on the sheet-metal part.

The plastic 5, 16 injection-molded thereon is shaped to form, on one hand, a ribbing stiffening the sheet-metal parts 2, 11 respectively, and, on the other hand, suitably shaped receptacles for various add-on parts. The sheet-metal part 2 of the scuttle 1 is made in one piece. In contrast, the sheet-metal part 11 of the dashboard carrier 10 is welded together from three prefabricated individual parts made of sheet metal. Specifically, the dashboard carrier 10 consists of a U-shaped cross section crossmember 13 which is curved longitudinally, a bracket 14 attached approximately centrally to the crossmember 13 on the underside and pointing obliquely forwards, and a steering-column jacket receptacle 15 mounted on the underside of the crossmember 13 in the region of the transverse position of the driver's seat and intended for the steering column 41.

The sheet-metal parts are produced from sheet steel with a sheet thickness of approximately 0.8 to 1.2 mm. The injection-molded-on plastic is a glass-fiber-reinforced polyamide, preferably PA 6/GF 30 with a wall thickness of between about 1 to 3 mm.

Among the functional shapes integrated by the plastic 5 injection-molded onto the scuttle board 2 are, as seen in FIG.

2, reinforcing ribs 6 for carriers under the windscreen, receiving bracket 8 for the windscreen-wiper motor 32, receptacles 9 for the front headlamps 35, and, with reference to FIG. 7, fastening brackets 7 and other receptacles, inter alia, pedal assembly with accelerator pedal 42, brake pedal 43 and clutch pedal 44, brake booster 30, windscreen-washing water tank 31 with spray pump, cooling-water compensator reservoir 33, brake-fluid reservoir 34, and service flap.

The plastic 16 injection-molded onto the sheet-metal part 11 of the dashboard carrier 10 integrates (with reference to FIG. 5), inter alia, in addition to reinforcing ribs 17, functional shapes including bottom shell 18 of the heating housing, heating-air outflow ducts 37 directed into the foot space, cable conduit 19 for the cable harness 38 and cable holder, a receptacle 22 for the front-seat passenger's airbag, namely in the region of the widening on the crossmember 13, receptacle 20 for the airbag-release device 39, and receptacle 21 for the fuse box 40.

Moreover, the water separator 36 for the heating-air intake is flanged onto the dashboard carrier 10 as seen in FIG. 7, and the suitable mounting can thereby be integrated accordingly.

The dashboard carrier 10 is covered with an upper trim part 49 and a lower trim part 48. Other essential instruments likewise belonging to a scuttle and cockpit module are also incorporated in the trim. The points of fastening the trim parts 48, 49 to the dashboard carrier 10 are likewise integrated into this composite part. As regards the instruments, the so-called multi-purpose instrument 46 for monitoring the driving and running of the vehicle by the vehicle driver are provided with two mirrorsymmetrically arranged operating levers 47, which are oriented approximately radially to the steering column 41 in the manner of steering-column switches, and fixedly on the dashboard in the region of the steering column, for actuating the direction indicators, headlamp flashers and the wipers. Furthermore, a mounting for a radio 45 is also provided in the trim parts.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Movable constructional unit adapted to be built into scuttle and cockpit regions of a vehicle body, wherein the constructional unit comprises two composite parts each of which consists of deep-drawn sheet metal and of plastic injection-molded thereon, one composite part forming a scuttle as the front end wall of a passenger space and the other composite part forming the dashboard carrier, and, at least one of bores, perforations and set-out tongues being provided at predetermined locations on the sheet metal components, to serve as positive anchoring points for the injection-molded-on plastic, and the injection-molded-on plastic being configured to form a reinforcing ribbing stiffening the associated sheet-metal parts and receptacles of predetermined shape for various add-on parts wherein the sheet-metal part of the scuttle is one piece, and the sheet-metal part comprising the dashboard carrier consists of welded-together prefabricated individual sheet-metal parts, in which one of the individual parts is a longitudinally curved crossmember of U-shaped cross-section, another is a bracket attached approximately centrally at an underside of the crossmember and points obliquely forwards, and still another is a steering-column jacket receptacle mountable on the crossmember in a transverse position region of a driver's seat for accommodating the steering column.

2. The constructional unit according to claim 1, wherein the sheet-metal parts are produced from sheet steel with a sheet thickness of approximately 0.8 to 1.2 mm.

3. The constructional unit according to claim 1, wherein the injection-molded on plastic is a glass-fiber-reinforced polyamide, including PA 6/GF 30, and has a wall thickness of between about 1 to 3 mm.

4. The constructional unit according to claim 1, wherein functional shapes are integrated via the plastic injection-molded onto the scuttle board and comprises the reinforcing ribbing for carriers under a windscreen, a receiving bracket for a windscreen-wiper motor, receptacles for front headlamps, and fastening brackets for associated accessories.

5. The constructional unit according to claim 1, wherein functional shapes are integrated via the plastic injection-molded onto the sheet-metal part of the dashboard carrier and comprise a bottom shell of a heater housing, heating-air outflow ducts directed into a foot space, cable conduit, a receptacle for a front-seat passenger's airbag, a receptacle for an airbag-release device, and a receptacle for a fuse box.

\* \* \* \* \*